US010955538B2

(12) United States Patent
Kwon et al.

(10) Patent No.: US 10,955,538 B2
(45) Date of Patent: Mar. 23, 2021

(54) POSITIONING TRANSMITTER, RECEIVER, AND SYSTEM, AND METHOD THEREFOR (71) Applicant: UNIVERSITY OF ULSAN FOUNDATION FOR INDUSTRY COOPERATION, Ulsan (KR)

(72) Inventors: Sungoh Kwon, Ulsan (KR); Baek Du Jo, Seoul (KR)

(73) Assignee: UNIVERSITY OF ULSAN FOUNDATION FOR INDUSTRY COOPERATION, Ulsan (KR)

( * ) Notice: Subject to any disclaimer, the term of this patent is extended or adjusted under 35 U.S.C. 154(b) by 477 days.

(21) Appl. No.: 15/753,254

(22) PCT Filed: Aug. 17, 2016

(86) PCT No.: PCT/KR2016/009050
§ 371 (c)(1),
(2) Date: Jul. 13, 2018

(87) PCT Pub. No.: WO2017/030373
PCT Pub. Date: Feb. 23, 2017

(65) Prior Publication Data
US 2019/0004165 A1 Jan. 3, 2019

(30) Foreign Application Priority Data
Aug. 17, 2015 (KR) .................. 10-2015-0115275

(51) Int. Cl.
G01S 3/80 (2006.01)
G01S 11/00 (2006.01)
(Continued)

(52) U.S. Cl.
CPC ................. G01S 11/00 (2013.01); G01S 5/02 (2013.01); G01S 5/18 (2013.01); G01S 5/30 (2013.01);
(Continued)

(58) Field of Classification Search
CPC ..... G01S 5/18; G01S 5/02; G01S 5/30; G01S 11/14; G01S 11/00; G01S 11/02; G01S 11/16
(Continued)

(56) References Cited

U.S. PATENT DOCUMENTS 9,063,218 B2 * 6/2015 Theilgaard ................ G01S 5/30
9,285,471 B2 * 3/2016 Lyon ..................... G01S 13/767
(Continued)

FOREIGN PATENT DOCUMENTS

JP 2009210582 9/2009
KR 1020060099580 9/2006
(Continued)

OTHER PUBLICATIONS

International Search Report dated Nov. 28, 2016 in corresponding PCT Application No. PCT/KR2016/009050.
(Continued)

Primary Examiner — Mark Hellner
(74) Attorney, Agent, or Firm — Porzio Bromberg & Newman P.C.

(57) ABSTRACT

A positioning system according to an embodiment of the above description includes a transmitter including a first transmitting unit and a second transmitting unit for transmitting a first signal and a second signal having different velocities, respectively; and a receiver including: a first receiving unit and a second receiving unit for measuring each time of reception of the first signal and the second signal; and a position determining unit for measuring a location of the transmitter using a difference in reception time of the first signal and the second signal.

8 Claims, 7 Drawing Sheets (51) Int. Cl.
*G01S 5/02* (2010.01)
*G01S 5/18* (2006.01)
*G01S 11/16* (2006.01)
*G01S 5/30* (2006.01)
*G01S 11/02* (2010.01)
*G01S 11/14* (2006.01)

(52) U.S. Cl.
CPC ............... *G01S 11/02* (2013.01); *G01S 11/14* (2013.01); *G01S 11/16* (2013.01)

(58) Field of Classification Search
USPC .......................................................... 367/124
See application file for complete search history.

(56) References Cited

U.S. PATENT DOCUMENTS 9,557,402 B2 * 1/2017 Bartov .................... G01S 11/16
2010/0090899 A1 * 4/2010 Zhao .......................... G01S 5/18
 342/387
2012/0158297 A1 * 6/2012 Kim ........................ H04W 4/80
 701/516

FOREIGN PATENT DOCUMENTS

| KR | 1020090040093 | 4/2009 |
| KR | 1020090044276 A | 5/2009 |
| KR | 020120069267 | 6/2012 |
| KR | 101537742 | 7/2015 |

OTHER PUBLICATIONS

Office Action dated Nov. 4, 2016 in corresponding Korean Patent Application No. 10-2015-0115275 (4 pages in Korean).
Office Action dated Jul. 27, 2017 in corresponding Korean Patent Application No. 10-2015-0115275 (4 pages in Korean).
Office Action dated Oct. 11, 2018 in corresponding Korean Patent Application No. 10-2018-0080178 (4 pages in Korean).

* cited by examiner

POSITIONING TRANSMITTER, RECEIVER, AND SYSTEM, AND METHOD THEREFOR

BACKGROUND

Technical Field

The following description relates to a positioning transmitter, receiver, and system, and a method therefor, and in particular, to a positioning transmitter, receiver, and system, and a method therefor capable of determining the exact position of an object and providing services related to the object position by using radio frequency and sound wave.

Background

In general, wireless communication techniques may be classified according to a range providing a communication service as: wireless mobile communication techniques providing a wireless communication service over a very wide area; and short-range wireless communication techniques providing a wireless communication service over a short range centering on a home, an office, a factory, a warehouse.

In the past, short-range wireless communication techniques were used for voice communication using a portable radio transceiver or a simple and low-capacity data transmission, but recently, due to the development of digital communication techniques and semiconductor techniques, various short-range wireless communication solutions capable of various wireless data transmission, wireless control of devices, transmission of multimedia such as voice, audio, and video are being developed and applied. In particular, wireless communication solutions are being developed for location awareness of multiple objects within a local area network.

In addition to military purpose, the location of a moving object can be used in private sectors in various forms, such as preventing missing child, logistics, sales support, providing directions to rescuers in an emergency, and providing operation information, and thus, it is a field that is currently studied with great interest.

In related arts, the positioning of a moving object is generally based on a Global Positioning System (GPS) or a base station position information of a mobile communication network. However, this method has a problem that it is not suitable for indoor use due to its large error range.

SUMMARY

The following description is presented to overcome the above-described problem of the related art and to provide a position measuring system and a method therefor capable of determining the position of an object (that is, a transmitter) indoors and outdoors with high accuracy of within several centimeters.

In addition, the following description is to provide a positioning system and a method therefor capable of determining a position of an object and providing services corresponding to the location information.

In one general aspect, there is provided a positioning system including: a transmitter comprising a first transmitting unit and a second transmitting unit for transmitting a first signal and a second signal with different velocities, respectively; and a receiver comprising: a first receiving unit and a second receiving unit for measuring each time of reception of the first signal and the second signal; and a position determining unit for measuring a location of the transmitter using a difference in reception time of the first signal and the second signal.

In another general aspect, a positioning method includes: transmitting simultaneously a first signal and a second signal having different velocities by a transmitter; and receiving the first and second signals by a receiver and measuring a position of the transmitter by using a difference in reception times by the receiver.

In another general aspect, a transmitter in respect to a positioning system includes a first transmitting unit and a second transmitting unit for respectively transmitting a first signal and a second signal with each unique frequency and different velocities; and a processor for controlling the first and second transmitting units and storing ID information. The transmitter transmits the ID information.

In another general aspect, a receiver in respect to a positioning system includes a first receiving unit and a second receiving unit for respectively receiving a first signal and a second signal with different velocities corresponding to ID information and measuring each time at which the first signal and second signal are received; and a position determining unit for measuring the location of the transmitter by using a difference in reception time of the first signal and the second signal.

According to a positioning system and a method therefor of the present application, a position of an object may be accurately determined.

In addition, there may be an effect of providing services related to position information based on the determined object location.

METHOD FOR CARRYING OUT THE INVENTION

The following description may have various modifications and embodiments, and specific embodiments are illustrated in the drawings and described in detail in the detailed description. In the following description, detailed description of related arts will be omitted if it is determined that the purport of the present description may be confused by the detailed description.

Hereinafter, exemplary embodiments of the present description are described in detail with reference to the accompanying drawings.

Figure 1:
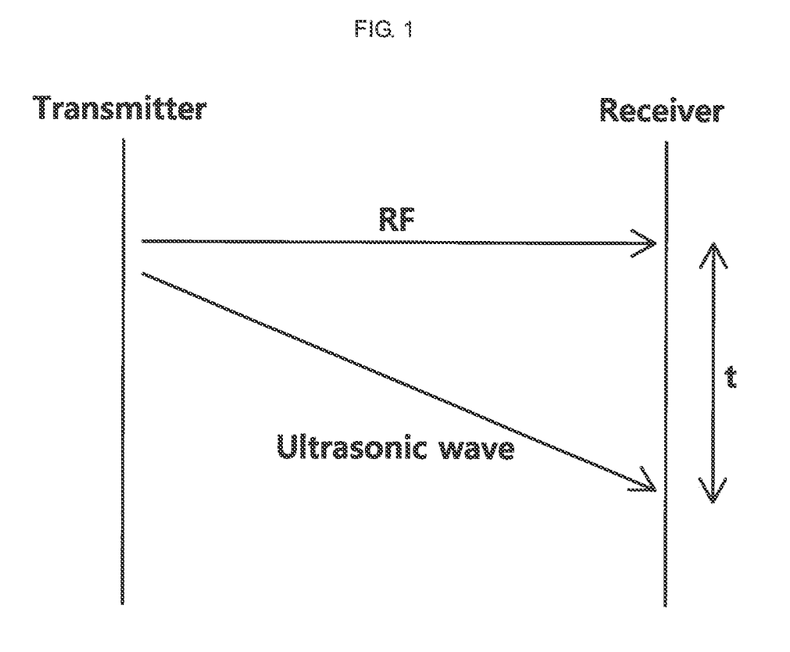
FIG. 1 is a drawing of differences in arrival time of a Radio Frequency (RF) and an ultrasonic wave.

FIG. 1 is a drawing of differences in arrival time of a Radio Frequency (RF) and an ultrasonic wave. A transmitter 100 transmits a first signal and a second signal with different velocities, such as an Ultrasonic signal and an RF, simultaneously and periodically. A receiver 200 includes a plurality of ultrasonic wave receiving units 210, 220, 230 and an RF receiving unit 240 and receives ultrasonic signals and RF signal from the transmitter 100. Using one RF receiving unit 240 allows a system to be configured with only one process, thereby capable of system simplification and component integration.

In the transmitter 100, an ultrasonic wave transmitting unit 110 is provided as one, but the present description is not limited thereto. A plurality of ultrasonic wave transmitting units may be provided depending on situation. Similarly, in the receiver 200, an ultrasonic wave receiving unit 210, 220, 230 may be provided as one. In the below examples, the case of a system with one ultrasonic wave transmitting unit and a plurality of ultrasonic signals receiving units is explained.

The plurality of ultrasonic wave receiving units 210, 220, 230 may be disposed spaced apart from each other, and the RF receiving unit 240 may be disposed inside a figure formed using the plurality of ultrasonic wave receiving units 210, 220, 230 as vertices. Although a case that a first signal and a second signal are an ultrasonic wave and an RF is illustrated in FIG. 1 as an embodiment, the present description is not limited thereto, and if there are other signals transmitted by the transmitter 100 have different velocities, the signals may be the first and second signals.

Since there may be a case that the receiver 200 receives an RF signal hut not receiving an ultrasonic signal due to a location where the transmitter 100 is installed, an obstacle and so on, the receiver 200 determines whether the ultrasonic signal is received within a predetermined time after the RF signal is received.

When the receiver 200 receives an RF signal and an ultrasonic signal from the transmitter 10, the transmitting velocity of an RF signal is much faster than the transmitting velocity of an ultrasonic signal, so a distance of the transmitter to the receiver may be measured by measuring a receiving time difference between the RF signal and the ultrasonic signal using a timer. That is, the distances between each ultrasonic wave receiving unit 210, 220, 230 located in one receiver 200 are even shorter, compared to a transmitting velocity of an RF signal that is a high frequency signal; therefore, a delay time until RF signal is received may be regarded as almost '0'.

In addition, a delay time until the RF signal is received may be disregarded even in a process of measuring distance to the transmitter. The fundamental equation for calculating the distance uses a difference (the result of subtracting the RF receiving time from the ultrasonic wave receiving time), but RF signal receiving time is very short and, thus, may be disregarded; therefore, only the ultrasonic wave receiving time may be used when calculating the distance.

In this embodiment, by regarding the receiving time difference between the RF signal and the frequency signal as a delay time until an ultrasonic signal is received and multiplying the receiving time difference by an ultrasonic wave velocity, each distance d1, d2, d3 between the transmitter and the ultrasonic wave receiving units 210, 220, 230 is calculated.

Figure 2:
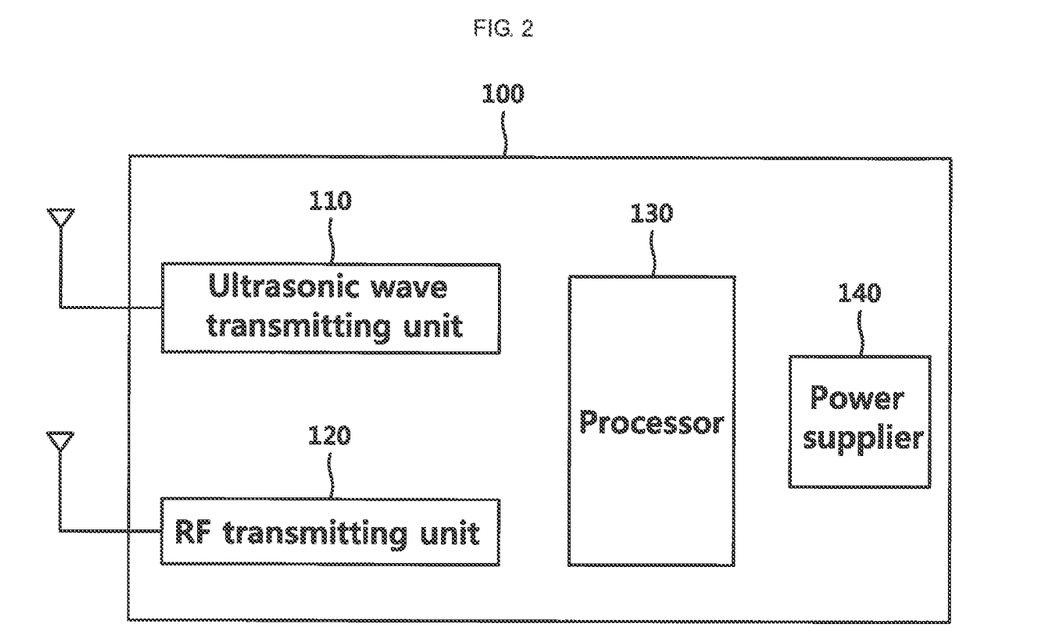
FIG. 2 is a drawing of an embodiment of a transmitter.

FIG. 2 is a drawing of an embodiment of the configuration of a transmitter. The transmitter 100 according to the embodiment may include an ultrasonic wave transmitting unit 110, an RF transmitting unit 120, a processor 130, and a power supplier 140. The ultrasonic wave transmitting unit 110 emits an ultrasonic signal and the RF transmitting unit 120 emits an RF signal.

The transmitter 100 is carriable by a user and may store IDs predetermined for each transmitter 100 and transmit information on its own ID including transmitter identifiers and frequency to be transmitted. The frequency refers to frequency of ultrasonic waves used for each transmitting unit, and the ultrasonic wave transmitting unit transmits an ultrasonic wave at a frequency corresponding to information on the frequency at which a corresponding RF transmitting unit transmitted.

The RF transmitting unit 120 is a device that may transmit signals of all RF types, such as Bluetooth, and the RF signal may be Bluetooth, Wi-Fi, Ultra-Wideband (UWB), and so on.

The ultrasonic wave transmitting unit 110 and the RF transmitting unit 120 simultaneously emit each signal; that is, an ultrasonic signal and an RF signal are transmitted at the same time, which may be controlled by the processor 130. The ultrasonic wave transmitting unit 110 and the RF transmitting unit 120 simultaneously emit each signal at predetermined time intervals, which may be repeatedly and periodically performed.

The power supplier 140 supplies a power required for operations of internal elements of the transmitter 100 and may be a secondary cell which can be charged.

Figure 3:
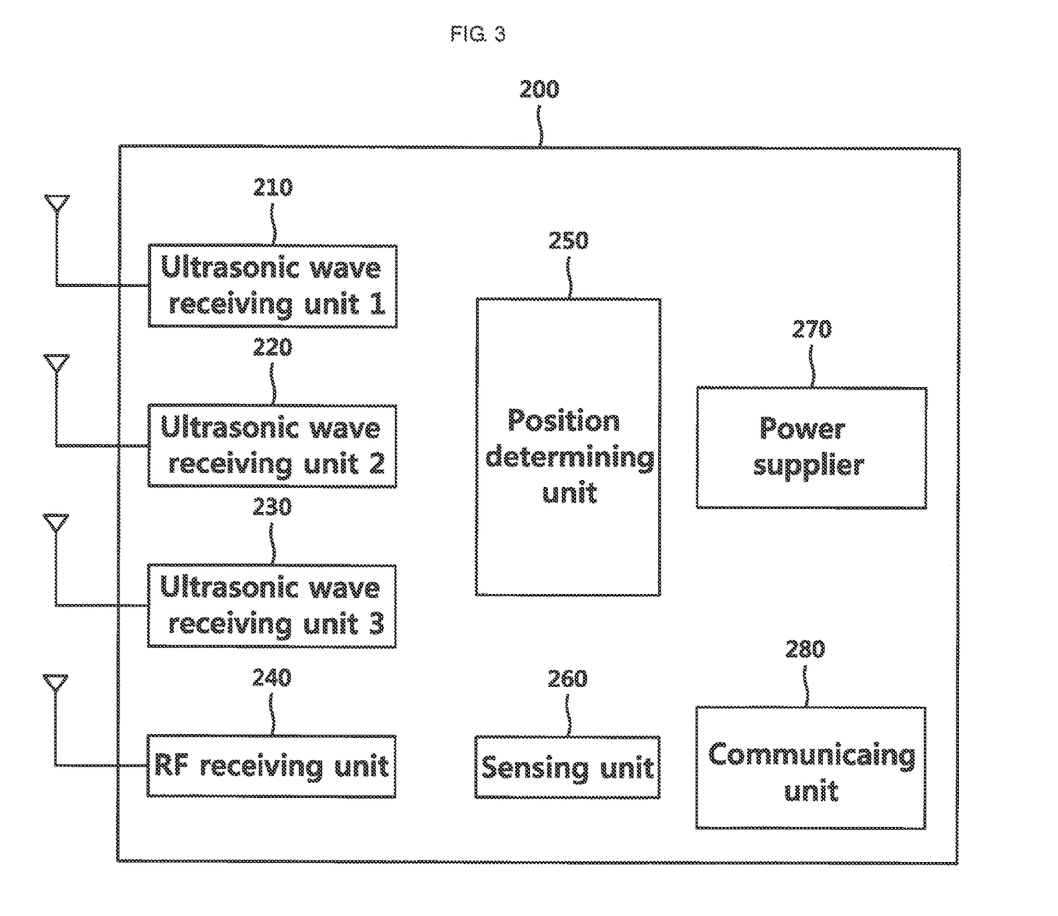
FIG. 3 is a drawing of an embodiment of a receiver.
Figure 4:
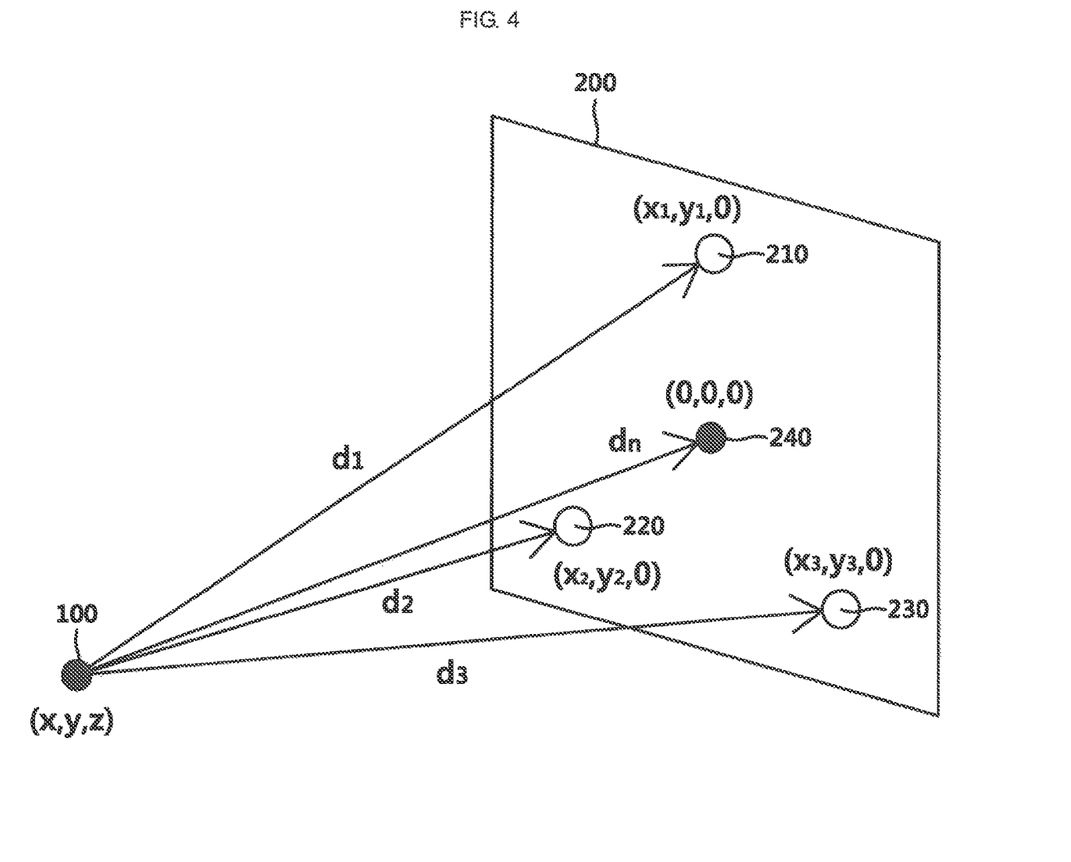
FIG. 4 is a drawing of an embodiment of a three-dimensional positioning method.

FIG. 3 is a drawing of an embodiment of a configuration of a receiver, and FIG. 4 is a drawing of an embodiment of a three-dimensional positioning method. A receiver 200 may include a plurality of ultrasonic wave receiving units 210, 220, 230, an RF receiving unit 240, a position determining unit 250, a sensing unit 260, a power supplier 270, and a communicating unit 280.

The plurality of ultrasonic wave receiving units 210, 220, 230, and the RF receiving unit 240 may be disposed on the same plane and may be disposed on different planes. In addition, the ultrasonic wave receiving units 210, 220, 230, are disposed apart from each other.

The RF receiving unit 240 selects one of IDs received and recognizes ultrasonic frequency corresponding to the selected ID. The ultrasonic wave receiving units 210, 220, 230 recognize signals of ultrasonic frequency corresponding to a corresponding ID. That is, in the receiver, a receiver (or a transmitter) corresponding to a transmitter (or a receiver) may be distinguished in the space where a plurality of transmitters and receivers are together by distinguishing IDs transmitted by transmitters and ultrasonic frequencies.

If the number of ultrasonic wave receiving units 210, 220, 230 are three, the RF receiving unit 240 may be disposed in a triangle whose vertices are the ultrasonic wave receiving units or disposed at the center of gravity of the triangle, but the location of the RF receiving unit 240 is not limited thereto. The plurality of ultrasonic wave receiving units 210, 220, 230 may be disposed forming a regular triangle, but the locations are not limited thereto. If the number of ultrasonic wave receiving units 210, 220, 230 is greater than three, the locations may be varied.

The plurality of ultrasonic wave receiving units 210, 220, 230 and the RF receiving unit 240 have each unique coordinate: coordinates of a ultrasonic wave receiving unit 1 (210), a ultrasonic wave receiving unit 2 (220), and a ultrasonic wave receiving unit 3 (230) are (x1, y1, z1), (x2, y2, z2), and (x3, y3, z3), respectively. In addition, the RF receiving unit 240 may be set as a starting point regarding the plurality of ultrasonic wave receiving units 210, 220, 230 and serve as a reference point in the three-dimensional space.

The number of the plurality of ultrasonic wave receiving units 210, 220, 230 disposed in the drawings are three, but it may be two or more than or equal to four.

If an ultrasonic signal is emitted from the ultrasonic wave receiving unit 110, the plurality of ultrasonic wave receiving units 210, 220, 230 receive the ultrasonic signal and measure a time when the ultrasonic signal is received. The time when the ultrasonic wave is received is different depending on locations of the ultrasonic wave receiving units 210, 220, 230, and distances between the transmitter 100 and respective ultrasonic wave receiving units 210, 220, 230 may be calculated via the method illustrated in FIG. 1, which are expressed by the following equation.

$$(x-x1)^2+(y-y1)^2+z^2=d_1^2$$

$$(x-x2)^2+(y-y2)^2+z^2=d_2^2$$

$$(x-x3)^2+(y-y3)^2+z^2=d_3^2 \quad \text{(Equation 1)}$$

In Equation 1, x, y, z are three-dimensional coordinates of the transmitter 100, and $d_1$, $d_2$, $d_3$ are the distance between the transmitter 100 and the ultrasonic wave receiving units 210, 220, 230, respectively. The (x1, y1), (x2, y2), and (x3, y3) are ultrasonic wave receiving unit 1 (210), ultrasonic wave receiving unit 2 (220), and ultrasonic wave receiving unit 3 (230), respectively. The plurality of ultrasonic wave receiving units 210, 220, 230 are disposed on the same plane and z-coordinate is set as 0. If the ultrasonic wave receiving units 210, 220, 230 are not disposed on the same plane, z-coordinate has a value except for 0, which may be reflected in Equation 1. In addition, the number of the plurality of ultrasonic wave receiving units 210, 220, 230 may be set as three.

The RF receiving unit 240 receives an RF signal from an RF transmitting unit 120, and the position determining unit 250 receives information of time when each signal is received from the receiving units and measures distance values ($d_1$, $d_2$, $d_3$) and estimates the location of the transmitter 100 using the above equation.

In short, ultrasonic wave receiving units 210, 220, 230 and RF receiving unit 240 measure a time when each signal is received and transmits time information to the position determining unit 250, and the position determining unit 250 estimates the location of a transmitter 100 using distance values $d_1$, $d_2$, $d_3$.

Although the location determining unit 250 may obtain coordinates of a transmitter 100 from Equation 1 when estimating a location of the transmitter 100, a distance error value may occur in each ultrasonic wave receiving unit, and thus, the coordinates of the transmitter 100 may be inaccurate. One position information may be estimated by measuring a position several times within a certain time and using a statistical processing value of the coordinates (x, y, z). The statistical processing value may be obtained from a value such as an average value, a median value, or a mode, but this is not intended to limit how to process statistics.

The sensing unit 260 may measure at least one of an external temperature, humidity, gyro, and acceleration. Since a distance is calculated using a time difference between the RF receiving unit 240 and the plurality of ultrasonic wave receiving units 210, 220, 230, it is important to exactly measure the time difference that from a time when the RF receiving unit 240 receives an RF signal to a time when the ultrasonic wave receiving units 210, 220, 230 receive ultrasonic signals. Therefore, the position determining unit 250 may calculate the velocity of an ultrasonic wave by reflecting the velocity difference of the ultrasonic wave varying depending on at least one condition of the temperature, humidity, gyro, and acceleration.

The power supplier 270 supplies a necessary power for operation of internal elements of the receiver 200. The communicating unit 280 is connected to the position determining unit 250 and performs a function of transmitting a position value measured by the position determining unit 250 to a service providing unit 300.

As described above, the plurality of ultrasonic wave receiving units 210, 220, 230 and the RF receiving unit 240 may be arranged in the same or different numbers. That is, after the RF receiving unit 240 receives an RF signal, each of the ultrasonic wave receiving units 210, 220, 230 receives an ultrasonic wave, each ultrasonic wave receiving unit measures a distance difference between each ultrasonic wave receiving unit 210, 220, 230 and a transmitter 100 by using a time difference between each time when receiving an ultrasonic wave and a time when receives an RF signal, and estimates a position using the distance.

Figure 5:
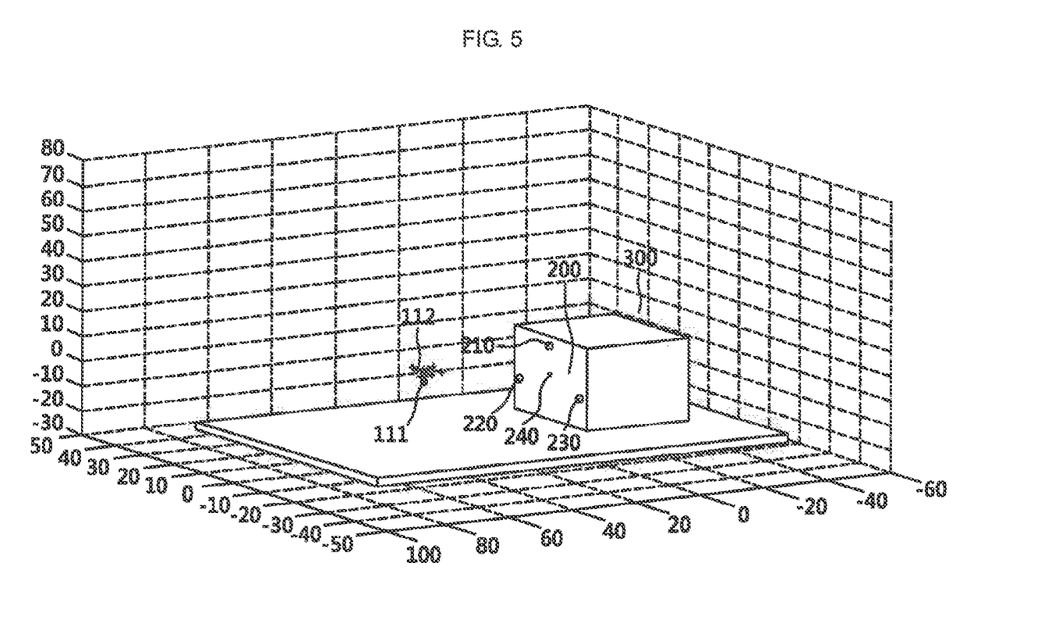
FIG. 5 is a drawing of a three-dimensional positioning simulation result according to an embodiment.

FIG. 5 is a drawing of a three-dimensional positioning simulation result according to an embodiment. This is three-dimensional coordinates of a transmitter 100 measured using MATLAB, and three ultrasonic wave receiving units 210, 220, 230 are located to form a regular triangle in front of a service providing unit 300, and an RF receiving unit 240 is located at the center of gravity of the regular triangle and becomes a reference point indicating a starting point. A red point 111 indicates a real coordinate of an ultrasonic wave transmitter, and a plurality of blue points 112 located near the red point refers to a three-dimensional coordinate of the ultrasonic wave transmitting unit 110 measured several times.

Each of the plurality of blue points 112 are obtained by averaging ten data values of three-dimensional coordinates, and an error range becomes broader if indicating coordinates per data value without averaging. Considering that a distance error between the red point 111 and a blue point separated farthest therefrom is less than or equal to 5 cm as illustrated in the figure, it may be confirmed that a relatively accurate position measurement is possible.

Figure 6:
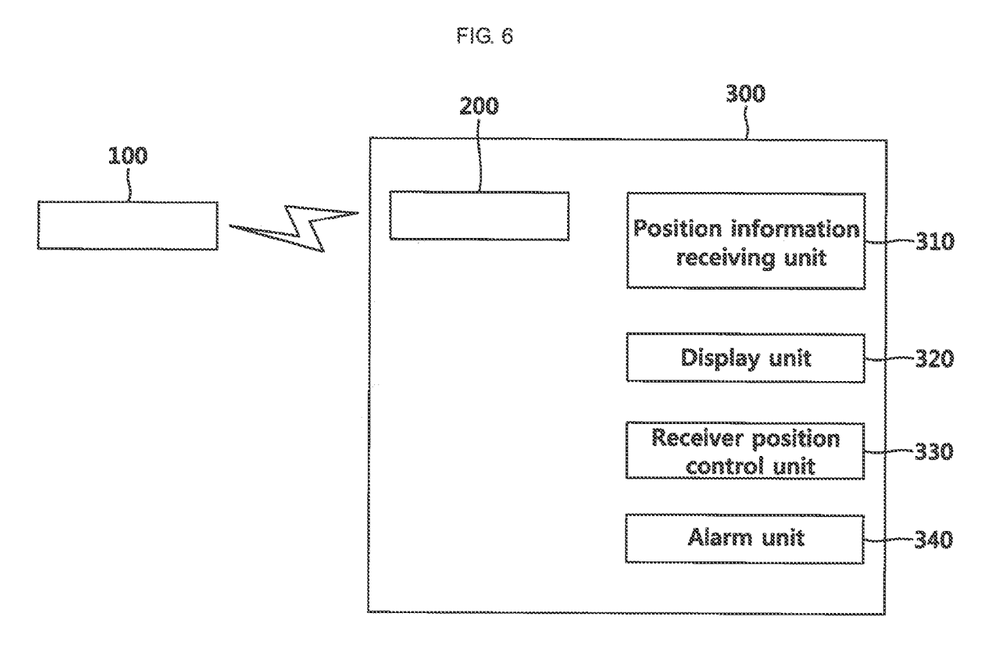
FIG. 6 is a drawing of an embodiment of a positioning system.

FIG. 6 is a drawing of an embodiment of a configuration of a positioning system. As illustrated, a positioning system according to an embodiment is a transmitter 100, a receiver 200, and a service providing unit 300. The service providing unit 300 may include a position information receiving unit 310, a display unit 320, a receiver position controlling unit 330, and an alarm unit 340.

The position information receiving unit 310 receives position information of a transmitter 100 from a communicating unit 280 of a receiver 200. The position information is information on a position of the transmitter 100 calculated from Equation 1 in the position determining unit 250. For example, if the service providing unit 300 is a cart in a big market, a display unit 320 would output information on a store inventory, price, discount, and so on. In addition, the service providing unit is not limited to a cart and is able to be applied to a baby carriage, a traveling bag, and so on.

The receiver position controlling unit 330 controls movement of the service providing unit 300 in which a receiver 200 is disposed in response to a position of the transmitter 100. That is, the movement of the transmitter 100 may be controlled so that the service providing unit 300 would be located in a predetermined distance range from the transmitter. In detail, the receiver position controlling unit 330 may move a service providing unit 300 so that each of the x, y, z values of (x, y, z) coordinates related to location information of the transmitter 100 have values within a predetermined range. At least one wheel is controlled in order to control a direction and a distance. The criterion for controlling direction and distance may be differently set as needed.

If a distance between the transmitter 100 and the receiver 200 exceeds a predetermined range, the alarm unit 340 may inform a user of the status via sound or vibration of the transmitter 100.

Figure 7:
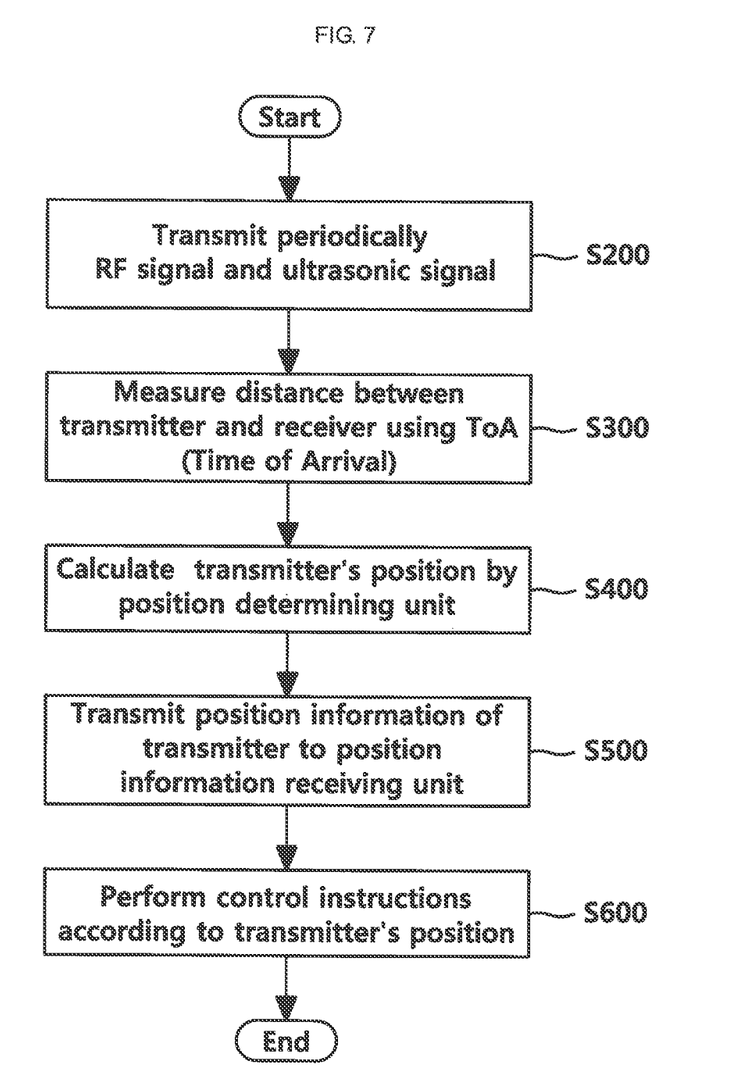
FIG. 7 is a drawing of an embodiment of a positioning method.

FIG. 7 is a drawing of an embodiment of a positioning method. A processor 130 of a transmitter 100 simultaneously operates an ultrasonic wave transmitting unit 110 and an RF transmitting unit 120 and controls to transmit an RF signal and an ultrasonic signal to a receiver 200 (S200). Just as power is applied to the transmitter and receiver, the transmitter transmits the RF signal and ultrasonic signal. At this time, the transmitter 100 repeatedly transmits the RF signal and the ultrasonic signal periodically.

Next, the receiver 200 measures a distance to the transmitter 100 based on a difference in reception time of an RF signal and an ultrasonic signal (S300), and a position determining unit 250 of the receiver 200 obtains position information of the transmitter 100 using the distance (S400); that is, it confirms in what direction and how far the transmitter 100 is separated from the receiver 200. The position of the transmitter 100 may be obtained as an average value after measuring the position a plurality of times.

Such a statistical processing value is not limited to the average value and may be a median value or a mode.

Next, the receiver 200 transmits a position information receiving unit 310 to the transmitter 100 (S500), and a receiver position controlling unit 330 performs control instructions based on the position information of the transmitter 100 (S600). Taking an example using FIG. 6, the service providing unit 300 is moved so that each of the x, y, and z values of coordinates (x, y, z) related to the position of the transmitter 100 is within a predetermined value.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A positioning system comprising:
a transmitter comprising a first transmitting unit and a second transmitting unit for transmitting a first signal and a second signal having different velocities, respectively;
a receiver comprising: a first receiving unit and a second receiving unit for measuring each time of reception of the first signal and the second signal; and a position determining unit for measuring a location of the transmitter using a difference in reception time of the first signal and the second signal; and
a service providing unit for providing a predetermined service in a response to the location of the transmitter, the receiver being disposed in the service providing unit,
wherein the service providing unit comprises a position information receiving unit for receiving information related to the position value of the transmitter from the position determining unit, a receiver position controlling unit for controlling movement of the service providing unit in response to the position value of the transmitter, and a display unit for outputting information related to space in which the service providing unit moving.

2. The positioning system of claim 1, wherein the first signal is a sound wave signal, and the second signal is a Radio Frequency (RF) signal.

3. The positioning system of claim 1, wherein the receiver further comprises a sensing unit measuring at least one of temperature, humidity, gyro, and acceleration in order to reflect velocity change of the first signal according to environment.

4. The positioning system of claim 1, wherein the receiver comprises at least two first signal receiving units for receiving the first signal.

5. The positioning system of claim 4, wherein the position determining unit reflects the difference in reception time of the first signal and the second signal and each coordinates of the first and second signal receiving units and measures a distance to the transmitter.

6. The positioning system of claim 1, wherein the position determining unit calculates a position value of the transmitter by using a statistical processing value of a position of the transmitter measured at least once or more in a predetermined time.

7. A positioning method comprising:
transmitting simultaneously a first signal and a second signal having different velocities by a transmitter;
receiving the first and second signals by a receiver and measuring a position of the transmitter by using a difference in reception times by the receiver;
transmitting the position of the transmitter to a service providing unit, the receiver being disposed in the service providing unit;
controlling movement of the service providing unit in response to the position of the transmitter, and
outputting information related to space in which the service providing unit is moving.

8. The positioning method of claim 7, wherein the position of the transmitter is measured using a difference between respective times at which a plurality of first signal receiving units receives the first signal and a time at which a second signal receiving unit receives the second signal.

* * * * *